United States Patent
Jo et al.

(10) Patent No.: US 11,921,309 B2
(45) Date of Patent: Mar. 5, 2024

(54) POLARIZING PLATE AND OPTICAL DISPLAY COMPRISING THE SAME

(71) Applicant: SAMSUNG SDI CO., LTD., Yongin-si (KR)

(72) Inventors: A Ra Jo, Suwon-si (KR); Beom Deok Lee, Suwon-si (KR); Seon Gyeong Jeong, Suwon-si (KR); Seong Hoon Lee, Suwon-si (KR); Seung Mi Shin, Suwon-si (KR); Wan Taek Hong, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/478,522

(22) Filed: Sep. 17, 2021

(65) Prior Publication Data
US 2022/0099873 A1    Mar. 31, 2022

(30) Foreign Application Priority Data
Sep. 25, 2020 (KR) .................. 10-2020-0125258

(51) Int. Cl.
  *G02B 5/30* (2006.01)
  *G02F 1/1335* (2006.01)
(52) U.S. Cl.
  CPC ......... *G02B 5/3041* (2013.01); *G02B 5/3083* (2013.01); *G02F 1/133528* (2013.01)
(58) Field of Classification Search
  CPC ............................ G02B 5/3041; G02B 5/3083
  See application file for complete search history.

(56) References Cited

U.S. PATENT DOCUMENTS

| | | | | |
|---|---|---|---|---|
| 2010/0208176 A1* | 8/2010 | Ge | ...... | G02F 1/13363 349/114 |
| 2019/0169388 A1* | 6/2019 | Kim | ...... | C08J 7/0427 |
| 2020/0264356 A1* | 8/2020 | Lee | ...... | G02F 1/133528 |
| 2021/0294013 A1* | 9/2021 | Ota | ...... | C08J 5/18 |
| 2022/0119687 A1* | 4/2022 | Shibata | ...... | C09K 19/3491 |

FOREIGN PATENT DOCUMENTS

| | | |
|---|---|---|
| JP | 2006-251659 A | 9/2006 |
| KR | 10-2020-0092159 A | 8/2020 |
| KR | 10-2020-0101548 A | 8/2020 |

OTHER PUBLICATIONS

Korean Office Action dated Dec. 26, 2023 issued in corresponding Korean Patent Application No. 10-2020-0125258 (5 pages).

* cited by examiner

*Primary Examiner* — Nathanael R Briggs
(74) *Attorney, Agent, or Firm* — Lewis Roca Rothgerber Christie LLP

(57) ABSTRACT

A polarizing plate and an optical display including the same are provided. A polarizing plate includes: a polarizer; and a first protective layer and a second protective layer sequentially stacked on a surface of the polarizer, and the second protective layer includes a positive C retardation layer, the positive C retardation layer having a thickness of about 10 μm or less, an index of refraction of about 1.50 to about 1.55, and a glass transition temperature (Tg) of about 150° C. to about 250° C.

21 Claims, 1 Drawing Sheet

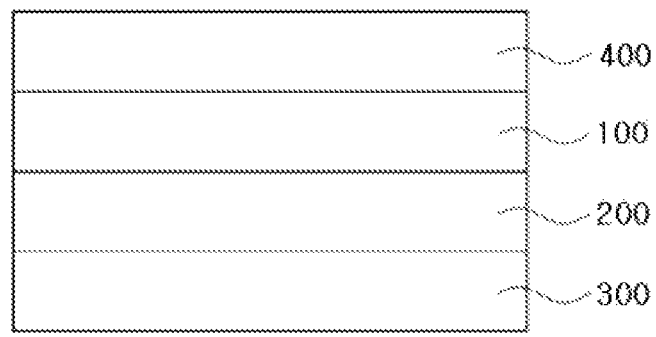

POLARIZING PLATE AND OPTICAL DISPLAY COMPRISING THE SAME

CROSS-REFERENCE TO RELATED APPLICATION

This application claims priority to and the benefit of Korean Patent Application No. 10-2020-0125258, filed on Sep. 25, 2020 in the Korean Intellectual Property Office, the entire disclosure of which is incorporated herein by reference.

BACKGROUND

1. Field

Aspects of embodiments of the present invention relate to a polarizing plate and an optical display including the same.

2. Description of the Related Art

In recent years, with increasing tendency of reduction in thickness of polarizing plates, various attempts have been made to develop a retardation film including a base film and a coating layer by coating a composition for the coating layer on the base film instead of bonding two films via an adhesive layer.

As one of liquid crystal displays, there is an in-plane switching (IPS) mode liquid crystal display. In the IPS mode liquid crystal display, nematic liquid crystals homogeneously aligned with no electric field applied thereto are driven by application of a lateral electric field to display an image. The IPS mode liquid crystal display has an advantage of a broader viewing angle than liquid crystal displays for other driving modes.

The IPS mode liquid crystal display has a problem of significant color variation (also referred to as lateral color shift) of an image according to viewing angle. Various attempts have been made to overcome color variation of an image through compensation for viewing angle and several sheets of optical compensation films. However, these techniques do not provide sufficient improvement in color variation. In recent years, color variation of an image has become more apparent with reduction in thickness and increase in size of liquid crystal displays. Accordingly, there is a need for IPS mode liquid crystal displays having a reduced thickness and a large area while securing good effects.

The background technique of the present invention is disclosed in Japanese Unexamined Patent Publication No. 2006-251659 and the like.

SUMMARY

According to an aspect of one or more embodiments of the present invention, a polarizing plate including a positive C retardation layer having a thin thickness is provided.

According to another aspect of one or more embodiments of the present invention, a polarizing plate that includes a positive C retardation layer to improve reliability and luminance is provided.

According to one or more embodiments of the present invention, a polarizing plate includes: a polarizer; and a first protective layer and a second protective layer sequentially stacked on a surface of the polarizer, wherein the second protective layer includes a positive C retardation layer, the positive C retardation layer having a thickness of about 10 µm or less, an index of refraction of about 1.50 to about 1.55, and a glass transition temperature (Tg) of about 150° C. to about 250° C.

In one or more embodiments, a difference in index of refraction between the positive C retardation layer and the first protective layer may be about 0.1 or less.

In one or more embodiments, a difference in index of refraction between the positive C retardation layer and the polarizer may be about 0.05 or less.

In one or more embodiments, the positive C retardation layer may be a non-liquid crystal layer.

In one or more embodiments, the positive C retardation layer may include at least one selected from among a cellulose ester compound or a polymer thereof and an aromatic compound or a polymer thereof.

In one or more embodiments, the aromatic compound may include a polystyrene compound.

In one or more embodiments, the polystyrene compound may include a halogen.

In one or more embodiments, the positive C retardation layer may have an out-of-plane retardation of about −180 nm to about 0 nm and an in-plane retardation of about 0 nm to about 10 nm at a wavelength of about 550 nm.

In one or more embodiments, a laminate of the first protective layer and the second protective layer may satisfy at least one of the following Relations 5 and 6:

$$Re(450)/Re(550) > Re(650)/Re(550),  \quad \text{Relation 5}$$

where Re(450), Re(550), and Re(650) denote in-plane retardations (unit: nm) of the laminate of the first protective layer and the second protective layer at wavelengths of about 450 nm, 550 nm, and 650 nm, respectively, and $$|Rth(450)|/|Rth(550)| > |Rth(650)|/|Rth(550)|, \quad \text{Relation 6}$$

where Re(450), Re(550), and Re(650) denote out-of-plane retardations (unit: nm) of the laminate of the first protective layer and the second protective layer at wavelengths of about 450 nm, 550 nm, and 650 nm, respectively.

In one or more embodiments, the laminate of the first protective layer and the second protective layer may have Re(450)/Re(550) of about 0.1 to about 10 and Re(650)/Re(550) of about 0.1 to about 5.

In one or more embodiments, the laminate of the first protective layer and the second protective layer may have |Rth(450)|/|Rth(550)| of about 0.1 to about 10 and |Rth(650)|/|Rth(550)| of about 0.1 to about 5.

In one or more embodiments, the laminate of the first protective layer and the second protective layer may satisfy the following Relation 7:

$$Rth(550)/Re(550) \le -50,$$

where Rth(550) denotes an out-of-plane retardation (unit: nm) of the laminate of the first protective layer and the second protective layer at a wavelength of about 550 nm, and Re(550) denotes an in-plane retardation (unit: nm) of the laminate of the first protective layer and the second protective layer at a wavelength of about 550 nm.

In one or more embodiments, the first protective layer may have an in-plane retardation of about 10 nm or less and an out-of-plane retardation of about −10 nm to about 10 nm at a wavelength of about 550 nm.

In one or more embodiments, the first protective layer may include a cellulose ester resin film.

In one or more embodiments, the first protective layer and the second protective layer may be sequentially stacked on the surface of the polarizer in the stated order or an order opposite to the stated order.

In one or more embodiments, the polarizing plate may further include a third protective layer on another surface of the polarizer.

In one or more embodiments, the third protective layer may have an in-plane retardation of about 5,000 nm or more at a wavelength of about 550 nm.

In one or more embodiments, the laminate of the first protective layer and the second protective layer may have an out-of-plane retardation variation rate of about −15% to 0%, as calculated by the following Equation 1:

Out-of-plane retardation variation rate=[(A−B)/B]×100, where B denotes an initial out-of-plane retardation (unit: nm) of the laminate of the first protective layer and the second protective layer at a wavelength of about 550 nm, and A denotes an out-of-plane retardation (unit: nm) of the laminate of the first protective layer and the second protective layer at a wavelength of about 550 nm after the laminate is left at about 60° C. and about 95% relative humidity (RH) for about 250 hours.

In one or more embodiments, the polarizing plate may have a machine direction (MD) shrinkage rate of about −0.48% to 0%, as calculated by the following Equation 2:

MD shrinkage rate=[(C−D)/D]×100, where D denotes an initial MD length (unit: mm) of the polarizing plate, and C denotes an MD length (unit: mm) of the polarizing plate after the polarizing plate is left at about 85° C. for about 24 hours.

In one or more embodiments, the polarizing plate may further include a fourth protective layer. The fourth protective layer may include a positive A retardation layer.

According to one or more embodiments of the present invention, an optical display includes a polarizing plate according to the present invention.

According to an aspect of one or more embodiments of the present invention, a polarizing plate includes a positive C retardation layer having a thin thickness.

According to another aspect of one or more embodiments of the present invention, a polarizing plate includes a positive C retardation layer to improve reliability and luminance.

BRIEF DESCRIPTION OF THE DRAWING

The FIGURE is a cross-sectional view of a polarizing plate according to an embodiment of the present invention.

DETAILED DESCRIPTION

Herein, some embodiments of the present invention will be described in further detail with reference to the accompanying drawings to provide a thorough understanding of the invention to those skilled in the art. It should be understood that the present invention may be embodied in different ways and is not limited to the following embodiments.

In the drawings, components unrelated to the description may be omitted for clarity of description of the invention, and like components are denoted by like reference numerals throughout the specification. Although lengths, thicknesses, or widths of various components may be exaggerated for understanding in the drawings, the present invention is not limited thereto Herein, spatially relative terms, such as "upper" and "lower," are defined with reference to the accompanying drawings. Thus, it is to be understood that the term "upper surface" can be used interchangeably with the term "lower surface," and when an element, such as a layer or a film, is referred to as being placed "on" another element, it can be directly placed on the other element, or one or more intervening elements may be present. On the other hand, when an element is referred to as being "placed directly on," "placed immediately on," "directly formed on," or "formed to directly contact" another element, there are no intervening element(s) therebetween.

Herein, "in-plane retardation Re," "out-of-plane retardation Rth," and "degree of biaxiality NZ" are represented by the following Equations A, B, and C, respectively:

$Re=(nx-ny)\times d$, (A);

$Rth=((nx+ny)/2-nz)\times d$, (B); and $NZ=(nx-nz)/(nx-ny)$, (C), where nx, ny, and nz are indexes of refraction of a corresponding optical device in the slow axis direction, the fast axis direction, and the thickness direction of the optical device at a measurement wavelength, respectively, and d is the thickness thereof (unit: nm). In Equations A to C, the measurement wavelength may be about 450 nm, about 550 nm, and/or about 650 nm.

Here, the x-axis direction is defined as the slow axis direction of an optical device and the y-axis direction is defined as the fast axis direction thereof. The optical device may be positive C retardation layer, a base layer, and/or a protective layer.

Here, "(meth)acryl" refers to acryl and/or methacryl.

Herein, a lateral side refers to a region from (60°, 45°) to (60°, 135°) or a region from (45°, 45°) to (45°, 135°) in the spherical coordinate system represented by ($\phi$, $\theta$) in which a front side is indicated by (0°, 0°), a left end point is indicated by (90°, 0°), and a right end point is indicated by (90°, 180°) with reference to the horizontal direction.

Herein, "index of refraction" may refer to a value measured at a wavelength of about 200 nm to about 800 nm, and, in embodiments, at a wavelength of about 550 nm.

Herein, "glass transition temperature" may be a value measured in a thermogram with respect to a positive C retardation layer using a thermal analyzer DSC 8000 (Perkin Elmer Co., Ltd.) by heating about 10 mg of the positive C retardation layer at a heating rate Ramp of about 10° C./min from about 20° C. to 300° C.

As used herein to represent a specific numerical range, the expression "X to Y" means "greater than or equal to X and less than or equal to Y."

According to aspects of embodiments of the present invention, a polarizing plate includes a positive C retardation layer having a thin thickness as a non-liquid crystal layer, thereby improving bending properties and reliability in a panel and improving color deviation at the right and the left and contrast ratio at a lateral side of the panel while maintaining luminance at a front side thereof. When applied to an optical display, the polarizing plate according to embodiments of the present invention has good effects in thickness reduction, luminance improvement and reliability, and can improve color deviation and the contrast ratio at the lateral side, thereby improving screen quality of the optical display.

Next, a polarizing plate according to an embodiment of the present invention will be described with reference to the drawing FIGURE. The FIGURE is a cross-sectional view of a polarizing plate according to an embodiment of the present invention.

Referring to the FIGURE, the polarizing plate includes a polarizer 100, a first protective layer 200, a second protective layer 300, and a third protective layer 400. In an embodiment, the third protective layer 400 is formed on an upper surface of the polarizer 100, and the first protective layer 200 and the second protective layer 300 are sequentially stacked on a lower surface of the polarizer 100 in the stated order from the polarizer.

Although not shown in the FIGURE, in an embodiment, an adhesive layer or a bonding layer may be formed on a lower surface of the second protective layer 300 to adhesively attach the polarizing plate to a panel of an optical display.

In an embodiment, the upper surface of the polarizer may correspond to a light exit surface of the polarizer, and the lower surface of the polarizer may correspond to a light incidence surface of the polarizer. That is, light emitted from the panel and incident on the polarizing plate may pass through the second protective layer, the first protective layer, the polarizer, and the third protective layer.

First Protective Layer

The first protective layer 200 may be directly formed on the second protective layer 300 and may support the second protective layer 300. As described below, the second protective layer 300 may be formed by coating a composition for the second protective layer 300, and, in an embodiment, a composition for a positive C retardation layer, on a surface of the first protective layer 200, followed by drying. Herein, the expression "directly formed on" means that there is no intervening adhesive or bonding layer between the first protective layer 200 and the second protective layer 300.

The first protective layer 200 may be an optically transparent film. For example, the first protective layer may have a total light transmittance of about 90% or more, for example, about 90% to about 100%. Within this range, the first protective layer 200 does not affect light having passed through the second protective layer 300.

The first protective layer 200 may include an optically anisotropic film or an optically isotropic film.

In an embodiment, the first protective layer may have an in-plane retardation of about 10 nm or less, for example, about 0 nm to about 10 nm, at a wavelength of about 550 nm. Within this range, the first protective layer 200 does not affect light having passed through the positive C retardation layer.

In an embodiment, the first protective layer 200 may have an out-of-plane retardation of about −10 nm to about 10 nm (for example, −10 nm, −9 nm, −8 nm, −7 nm, −6 nm, −5 nm, −4 nm, −3 nm, −2 nm, −1 nm, 0 nm, 1 nm, 2 nm, 3 nm, 4 nm, 5 nm, 6 nm, 7 nm, 8 nm, 9 nm, or 10 nm), for example, 0 nm to about 5 nm, at a wavelength of about 550 nm. Within this range, the first protective layer 200 does not affect light entering the polarizing plate or light having passed through the positive C retardation layer.

The first protective layer 200 may include a stretched film or a non-stretched film. The non-stretched film can minimize influence on shrinkage of the positive C retardation layer upon formation of the positive C retardation layer.

In an embodiment, the first protective layer 200 may include at least one selected from among cellulose ester resins including triacetylcellulose and the like, cyclic polyolefin (COP) resins including norbornene, amorphous cyclic polyolefin, and the like, polycarbonate resins, polyester resins including polyethylene terephthalate, polybutylene terephthalate, polyethylene naphthalate, polybutylene naphthalate, and the like, polyether sulfone resins, polysulfone resins, polyamide resins, polyimide resins, non-cyclic polyolefin resins, poly(meth)acrylate resins including poly(methyl methacrylate) and the like, polyvinyl alcohol resins, polyvinyl chloride resins, polyvinylidene chloride resins, and acrylic resins, without being limited thereto.

In an embodiment, the first protective layer 200 includes a cellulose ester resin film including triacetylcellulose and the like. The cellulose ester resin film may improve adhesion of the first protective layer to the positive C retardation layer upon formation of the positive C retardation layer using the composition for the positive C retardation layer described below.

In an embodiment, the first protective layer 200 may have a lower index of refraction than the second protective layer 300 and may have an index of refraction of about 1.45 to about 1.50, for example, about 1.45 to less than 1.50, and, in an embodiment, about 1.47 to about 1.49.

In an embodiment, the first protective layer 200 may have a thickness of about 10 μm to about 200 μm, and, in an embodiment, about 20 μm to about 80 μm. Within this range, the first protective layer 200 can be used in the polarizing plate.

Second Protective Layer

The second protective layer 300 includes a positive C retardation layer. The positive C retardation layer improves screen quality by reducing color variation at a lateral side in a liquid crystal display, specifically in an IPS or FFS mode liquid crystal display.

The positive C retardation layer means a layer satisfying a relation: $nz > nx \approx ny$ where nx, ny, and nz are the indexes of refraction of the positive C plate layer in the slow axis direction, the fast axis direction, and the thickness direction thereof at a wavelength of 550 nm, respectively.

In an embodiment, the positive C retardation layer may have an out-of-plane retardation of about −180 nm to about 0 nm, and, in an embodiment, about −150 nm to about 0 nm, and, in an embodiment, about −150 nm to about −30 nm, and, in an embodiment, about −120 nm to about −50 nm, at a wavelength of about 550 nm. Within this range, the second protective layer 300 can improve screen quality by reducing color variation at the lateral side.

In an embodiment, the positive C retardation layer may have an in-plane retardation of about 0 nm to about 10 nm, and, in an embodiment, about 0 nm to about 8 nm, and, in an embodiment, about 0 nm to about 5 nm, at a wavelength of about 550 nm. Within this range, the positive C retardation layer does not affect light entering the retardation film or light having passed through the positive C retardation layer.

The positive C retardation layer may be a non-liquid crystal layer free from a liquid crystal polymer or a monomer forming the liquid crystal polymer. Accordingly, the positive C retardation layer does not suffer from the aforementioned problem caused by a liquid crystal layer.

The positive C retardation layer may have a thickness of about 10 μm or less. According to the present invention, with a thickness of about 10 μm or less, the positive C retardation layer can have the above out-of-plane retardation and can be manufactured by coating, unlike a typical retardation film manufactured by solvent casting and the like. Within this range, the positive C retardation layer can achieve the above out-of-plane retardation while enabling reduction in thickness of the polarizing plate. In an embodiment, the positive C retardation layer may have a thickness of greater than about 0 μm to 10 μm or less, and, in an embodiment, about 0.5 μm to about 10 μm.

In an embodiment, the positive C retardation layer may have a glass transition temperature of about 150° C. to about 250° C. (for example, 150° C., 160° C., 170° C., 180° C., 190° C., 200° C., 210° C., 220° C., 230° C., 240° C., or 250° C.). According to the present invention, the positive C retardation layer may be formed of a non-liquid crystal material to have a glass transition temperature of about 150° C. to about 250° C. Within this range of the glass transition temperature, the thin positive C retardation layer can improve reliability of the polarizing plate. Herein, "reliability" means that the second protective layer 300 or the laminate of the first protective layer 200 and the second protective layer 300 suffers from less variation in retardation and has a small shrinkage rate at high temperature (about 85° C.) when left under high temperature and high humidity conditions (about 60° C. and about 95% RH) for a long period of time.

In an embodiment, the second protective layer 300, the positive C retardation layer, or the laminate of the first protective layer 200 and the second protective layer 300 has an out-of-plane retardation variation rate of about −15% to 0%, for example, about −10% to 0%, as calculated by the following Equation 1:

Out-of-plane retardation variation rate=$[(A−B)/B]\times 100$, where B denotes an initial out-of-plane retardation (unit: nm) of the second protective layer, the positive C retardation layer, or the laminate of the first protective layer and the second protective layer at a wavelength of about 550 nm, and A denotes an out-of-plane retardation (unit: nm) of the second protective layer, the positive C retardation layer, or the laminate of the first protective layer and the second protective layer at a wavelength of about 550 nm after being left at about 60° C. and about 95% RH for about 250 hours.

Within this range, the polarizing plate can have high reliability.

In an embodiment, the polarizing plate may have an MD shrinkage rate of about −0.48% to 0%, for example, about −0.45% to about −0.35%, as calculated by the following Equation 2:

MD shrinkage rate=$[(C−D)/D]\times 100$, where D denotes an initial MD length (unit: mm) of the polarizing plate, and C denotes an MD length (unit: mm) of the polarizing plate after the polarizing plate is left at about 85° C. for about 24 hours. Here, the initial MD length means the length of the polarizing plate before the polarizing plate is left at about 85° C. for about 24 hours.

Within this range, the polarizing plate can exhibit good bending properties in panel reliability.

In an embodiment, the positive C retardation layer may have a glass transition temperature of about 170° C. to about 230° C., for example, a glass transition temperature of about 180° C. to about 220° C. Within this range, the positive C retardation layer can be easily manufactured while securing good dimensional stability. Adjustment of the glass transition temperature of the positive C retardation layer will be described in further detail.

According to the present invention, the positive C retardation layer is formed of a non-liquid crystalline polymer and the index of refraction of the positive C retardation layer is controlled to about 1.50 to about 1.55 (for example, 1.5, 1.51, 1.52, 1.53, 1.54, or 1.55) to improve luminance. Within this range, the positive C retardation layer can prevent or substantially prevent generation of interference patterns between the layers while improving light extraction efficiency without luminance loss by reducing a difference in index of refraction between the second protective layer 300 and the polarizer 100 while light passes through the second protective layer 300, the first protective layer 200, and the polarizer 100. A method of adjusting the index of refraction of the positive C retardation layer will be described in further detail.

In an embodiment, the positive C retardation layer may have an index of refraction of about 1.50 to about 1.53.

In an embodiment, a difference in index of refraction between the second protective layer 300 (specifically, the positive C retardation layer) and the first protective layer 200 may be about 0.1 or less, for example, about 0 to about 0.06. Within this range, the polarizing plate can prevent or substantially prevent luminance loss of light emitted from the optical display. In an embodiment, the first protective layer 200 may have the same index of refraction as or a smaller index of refraction than the second protective layer 300 (specifically, the positive C retardation layer).

In an embodiment, a difference in index of refraction between the second protective layer 300 (specifically, the positive C retardation layer) and the polarizer 100 may be about 0.05 or less, for example, about 0 to about 0.02. Within this range, the polarizing plate can prevent or substantially prevent luminance loss of light emitted from the optical display. In an embodiment, the polarizer 100 may have the same index of refraction as or a greater index of refraction than the second protective layer 300 (specifically, the positive C retardation layer).

The positive C retardation layer may be formed of a composition for the positive C retardation layer.

The composition for the positive C retardation layer contains at least one selected from among a cellulose ester compound or a polymer thereof and an aromatic compound or a polymer thereof. In an embodiment, the positive C retardation layer contains at least one selected from among the cellulose ester compound or a polymer thereof and the aromatic compound or a polymer thereof. At least one selected from among the cellulose ester compound or a polymer thereof and the aromatic compound or a polymer thereof may form the positive C retardation layer while easily satisfying the glass transition temperature and the index of refraction as set forth above.

Next, the cellulose ester compound will be described.

The cellulose ester compound may include at least one selected from among a cellulose ester resin, a cellulose ester oligomer, and a cellulose ester monomer.

The cellulose ester compound may include a condensation product obtained through reaction between a hydroxyl group on a cellulose ester and carboxylic acid or carboxylic anhydride.

The cellulose ester compound may be regioselectively or randomly substituted. Regioselectivity may be measured by determining a relative degree of substitution at the positions of $C_6$, $C_3$ and $C_2$ on the cellulose ester by carbon 13 NMR. The cellulose ester compound may be prepared by a typical method through contact between a cellulose solution and at least one $C_1$ to $C_{20}$ acylation agent for a sufficient contact time to provide a cellulose ester having a desired degree of substitution and a desired degree of polymerization.

In an embodiment, the acylation agent includes at least one linear or branched $C_1$ to $C_{20}$ alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chlorides. Examples of the acetoacetic ester may include methyl acetoacetate, ethyl acetoacetate, propyl acetoacetate, butyl acetoacetate, and tertiary butyl acetoacetate. In an embodiment, the acylation agent includes linear or branched $C_2$ to $C_9$ alkyl carboxylic acid anhydrides, such as acetic anhydride, propionic anhydride, butyric anhydride, 2-ethylhexanoic anhydride, nonanoic anhydride, and stearic anhydride.

In an embodiment, the cellulose ester compound includes, for example, any of cellulose acetate (CA), cellulose acetate propionate (CAP), and cellulose acetate butyrate (CAB), without being limited thereto.

In an embodiment, the cellulose ester compound may include at least two acyl group substituents. At least one of the acyl groups may include an aromatic substituent and, in the cellulose ester compound, a relative degree of substitution (RDS) may be set in the order of C6>C2>C3. C6 means a degree of substitution at the position of the number 6 carbon in the cellulose ester, C2 means a degree of substitution at the number 2 carbon in the cellulose ester, and C3 means a degree of substitution at the number 3 carbon in the cellulose ester. The aromatic compound may include benzoate or substituted benzoate.

In another embodiment, the cellulose ester compound may include a regioselectively substituted cellulose ester compound having (a) a plurality of chromophore-acyl substituents and (b) a plurality of pivaloyl substituents.

The cellulose ester compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester compound and the degree of chromophore-acyl substitution at the number 3 carbon in the cellulose ester compound and the degree of chromophore-acyl substitution at the number 6 carbon in the cellulose ester compound may be in a range from about 0.1 to about 1.6; and the chromophore-acyl may be selected from among the following (i), (ii), (iii), and (iv):

(i) ($C_6$ to $C_{20}$)aryl-acyl, where aryl is unsubstituted or substituted with 1 to 5 $R^1$s;
(ii) hetero-aryl, where hetero-aryl is a five to ten-membered ring having 1 to 4 hetero atoms selected from among N, O and S, and is unsubstituted or substituted with 1 to 5 $R^1$s;

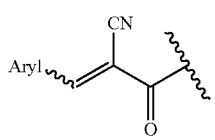

(iii)

where aryl is a $C_1$ to $C_6$ aryl and is unsubstituted or substituted with 1 to 5 $R^1$s; and

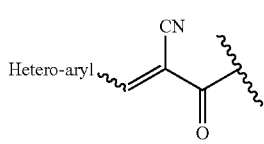

(iv)

where heteroaryl is a five to ten-membered ring having 1 to 4 hetero atoms selected from among N, O, and S, and is unsubstituted or substituted with 1 to 5 $R^1$s, $R^1$s being each independently nitro, cyano, ($C_1$ to $C_6$)alkyl, halo($C_1$ to $C_6$)alkyl, ($C_6$ to $C_{20}$)aryl-$CO_2$—, ($C_6$ to $C_{20}$)aryl, ($C_1$ to $C_6$)alkoxy, halo($C_1$ to $C_6$)alkoxy, halo, five to ten-membered heteroaryl having 1 to 4 hetero atoms selected from among N, O and S, or

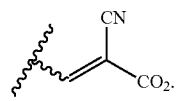

In an embodiment, the chromophore-acyl may be unsubstituted or substituted benzoyl or unsubstituted or substituted naphthyl.

In an embodiment, the chromophore-acyl may be selected from the group consisting of:

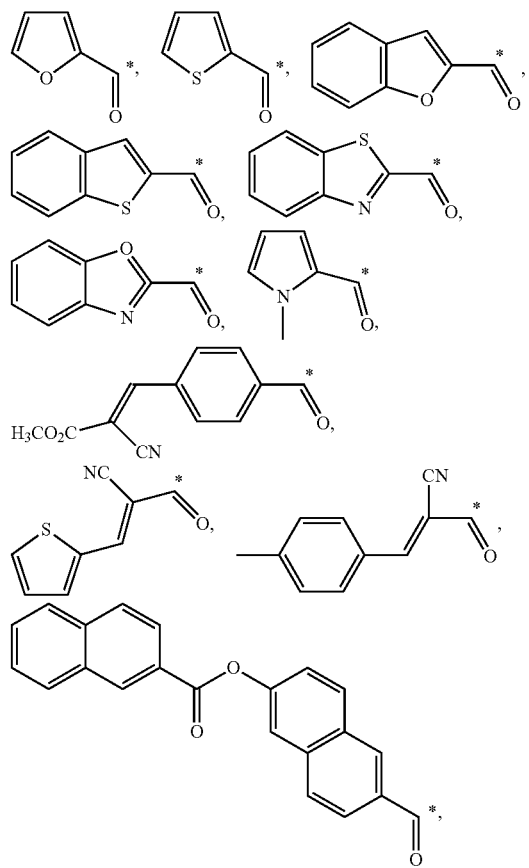

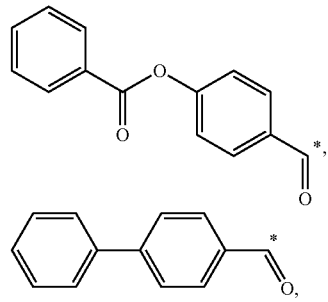

-continued

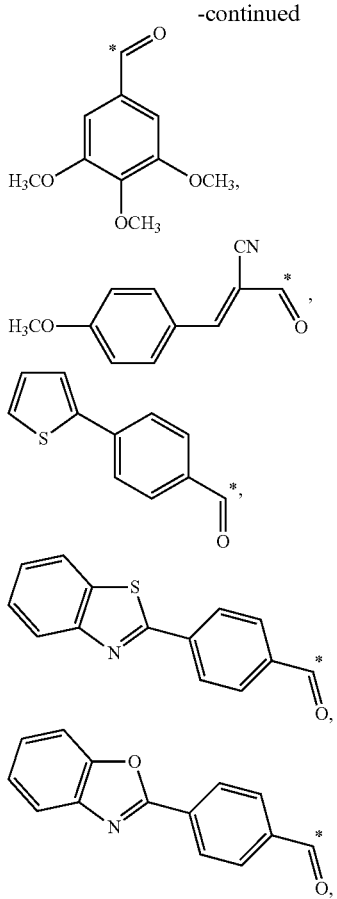

or
where * indicates a linking site of the chromophore-acyl substituent to oxygen of the cellulose ester.

In another embodiment, the cellulose ester compound may include an ester polymer having an acyl unit, in which at least some hydroxyl groups [a $C_2$ hydroxyl group, a $C_3$ hydroxyl group or a $C_6$ hydroxyl group] of a sugar monomer constituting cellulose are unsubstituted or substituted, as represented by the following Formula 1:

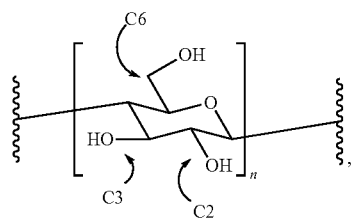

where n is an integer of 1 or more.

A substituent group for the cellulose ester polymer or the acyl unit may include at least one selected from among a halogen atom, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(=O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen based compounds for convenience. The composition for the second retardation layer may include the cellulose ester polymer alone or a mixture including the cellulose ester polymer.

Here, "halogen" means fluorine (F), Cl, Br, or I, and, in an embodiment, F.

The "halogen-containing functional group" is an organic functional group containing at least one halogen atom and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—* (* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

In an embodiment, the composition for the positive C plate retardation layer includes a cellulose ester polymer substituted with an acyl group, a halogen, or a halogen-containing functional group. In an embodiment, the halogen is fluorine. In an embodiment, the halogen may be present in an amount of 1 wt % to 10 wt % in the cellulose ester polymer. Within this range, the composition allows easy formation of the positive C plate retardation layer having properties of the present invention and can improve ellipticity.

For formation of the positive C plate retardation layer, the cellulose ester polymer may be prepared by a typical method known to those skilled in the art or may be obtained from commercially available products. For example, the cellulose ester polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

Next, the aromatic compound will be described.

The aromatic compound includes a phenyl group and may include a polystyrene compound or a fluorobenzene or difluorobenzene structure, without being limited thereto. In an embodiment, the polystyrene compound may include a moiety represented by the following Formula 2:

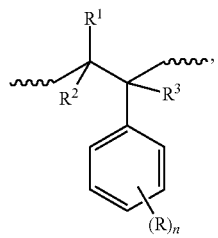

where ~~~~~ is a linking site of an atom, $R^1$, $R^2$ and $R^3$ are each independently a hydrogen atom, an alkyl group, a substituted alkyl group, or a halogen; Rs are each independently a substituent group on a styrene ring; and n is an integer of 0 to 5 indicating the number of substituent groups on the styrene ring.

Examples of the substituent group R on the styrene ring may include an alkyl group, a substituted alkyl group, a halogen atom, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group. Here, "substituted" in the "substituted alkyl group" means that a hydrogen atom is substituted with any one of these substituent groups.

In an embodiment, at least one of $R^1$, $R^2$, and $R^3$ may be a halogen, and, in an embodiment, fluorine.

The compound for the positive C retardation layer may further include a solvent. The solvent may include at least one organic solvent selected from among propylene glycol methyl ether, propylene glycol methyl ether acetate (PG-MEA), methyl isopropyl ketone, methyl isobutyl ketone, toluene, xylene, methyl ethyl ketone, methanol, ethyl acetate, dichloromethane, cyclopentanone, tetrahydrofuran, and methyl tert-butyl ether, without being limited thereto.

The compound for the positive C retardation layer may further include an aromatic fused ring-containing compound.

The aromatic fused ring-containing compound serves to adjust out-of-plane retardation and wavelength dispersion of the positive C retardation layer. The aromatic fused ring-containing compound includes naphthalene, anthracene, phenanthrene, pyrene, a compound represented by the following Structure 1, or a compound represented by the following Structure 2. The aromatic fused ring-containing compound may include 2-naphthyl benzoate, 2,6-naphthalene dicarboxylic acid diester represented by the following Structure 3, naphthalene, and an abietic acid ester represented by the following Structure 4, without being limited thereto:

Structure 1

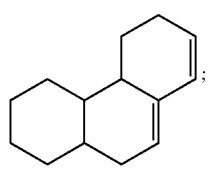

Structure 2

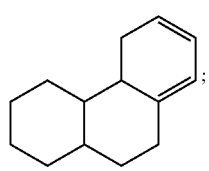

Structure 3

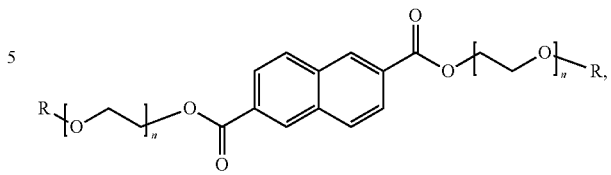

where R is a $C_1$ to $C_{20}$ alkyl group or a $C_6$ to $C_{20}$ aryl group, and n is an integer of 0 to 6; and Structure 4

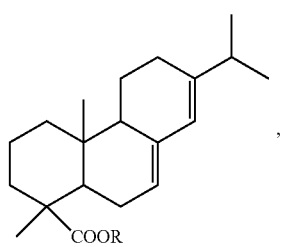

where R is a $C_1$ to $C_{20}$ alkyl group or a $C_6$ to $C_{20}$ aryl group.

In an embodiment, the aromatic fused-ring containing additive includes at least one selected from among naphthalene, anthracene, phenanthrene, pyrene, 2-naphthyl benzoate, and 2,6-naphthalene dicarboxylic acid diester represented by Structure 1.

The aromatic fused-ring containing additive may be optionally present in an amount of about 30 wt % or less, and, in an embodiment, about 0.1 wt % to about 30 wt %, and, in an embodiment, about 10 wt % to about 30 wt %, in the positive C retardation layer. Within this range, the additive can improve thermal stability of the composition and retardation of the polarizing plate per unit thickness, and can adjust wavelength dispersion.

The composition for the positive C retardation layer may further include additives, for example, plasticizers, stabilizers, UV absorbents, anti-blocking agents, slipping agents, lubricants, dyes, pigments, and retardation enhancers, without being limited thereto.

The positive C retardation layer may be formed by coating the composition for the positive C retardation layer to a thickness (e.g., a predetermined thickness) on a surface of the first protective layer 200 to form a coating layer, followed by heat fixing the coating layer. Coating may be performed by a typical method known to those skilled in the art, for example, Meyer bar coating, die coating, and the like. Heat fixing may include heat treatment of the coating layer at about 40° C. to about 200° C., and, in an embodiment, at about 60° C. to about 150° C., for about 1 to 10 minutes.

The glass transition temperature of the positive C retardation layer may be adjusted by heat fixing the coating layer after the coating layer for the positive C retardation layer is formed by, for example, coating.

The index of refraction of the positive C retardation layer may be adjusted through adjustment of the solvent or the content of the solvent.

In an embodiment, the positive C retardation layer may satisfy at least one of the following Relations 3 and 4:

$$Re(450)/Re(550) > Re(650)/Re(550),$$ Relation 3 where Re(450), Re(550), and Re(650) denote in-plane retardations (unit: nm) of the positive C retardation layer at wavelengths of about 450 nm, 550 nm, and 650 nm, respectively; and $$|Rth(450)|/|Rth(550)|>|Rth(650)|/|Rth(550)|, \qquad \text{Relation 4}$$

where Rth(450), Rth(550), and Rth(650) denote out-of-plane retardations (unit: nm) of the positive C retardation layer at wavelengths of about 450 nm, 550 nm, and 650 nm, respectively.

The positive C retardation layer can assist in improvement in front contrast ratio, lateral color shift, and black visibility by satisfying at least one of Re and Rth as defined in Relations 3 and 4.

In an embodiment, the positive C retardation layer further improves front contrast, lateral color shift, and black visibility by satisfying Relation 4. In an embodiment, the positive C retardation layer further improves front contrast, lateral color shift, and black visibility by satisfying both Relations 3 and 4.

In an embodiment, the positive C retardation layer may have Re(450)/Re(550) of about 0.1 to about 10, and, in an embodiment, about 0.5 to about 5, and, in an embodiment, about 1 to about 3, and Re(650)/Re(550) of about 0.1 to about 5, and, in an embodiment, about 0.1 to about 3, and, in an embodiment, about 0.5 to about 2. Within this range, Relation 3 can be easily realized.

In an embodiment, the positive C retardation layer may have Re(450) of about 0 nm to about 10 nm, and, in an embodiment, about 0 nm to about 7 nm, Re(550) of about 0 nm to about 10 nm, and, in an embodiment, about 0 nm to about 8 nm, and, in an embodiment, about 0 nm to about 5 nm, and Re(650) of about 0 nm to about 6 nm, and, in an embodiment, about 0 nm to about 3 nm. Within this range, Relation 3 can be easily realized.

In an embodiment, the positive C retardation layer may have |Rth(450)|/|Rth(550)| of about 0.1 to about 10, and, in an embodiment, about 0.5 to about 5, and, in an embodiment, about 1 to about 3.5, and, in an embodiment, about 1 to about 3, and |Rth(650)|/|Rth(550)| of about 0.1 to about 5, and, in an embodiment, about 0.1 to about 3, and, in an embodiment, about 0.1 to about 2. Within this range, Relation 4 can be easily realized.

In an embodiment, the positive C retardation layer may have Rth(450) of about −200 nm to about 0 nm, and, in an embodiment, about −150 nm to about 0 nm, Rth(550) of about −180 nm to about 0 nm, and, in an embodiment, about −150 nm to about 0 nm, and, in an embodiment, about −150 nm to about −30 nm, and, in an embodiment, about −150 nm to about −50 nm, and Rth(650) of about −160 nm to about 0 nm, and, in an embodiment, about −130 nm to about 0 nm. Within this range, Relation 4 can be easily realized.

Relations 3 and 4 of the positive C retardation layer may be realized using the composition for the positive C retardation layer described above while adjusting at least one selected from among the kind of solvent, the content of the solvent, the coating thickness, and drying conditions.

In an embodiment, the laminate of the first protective layer 200 and the second protective layer 300 (specifically, the positive C retardation layer) or the second protective layer 300 may satisfy at least one of the following Relations 5 and 6. As a result, the laminate can assist in improvement in front contrast and lateral color shift.

$$Re(450)/Re(550)>Re(650)/Re(550), \qquad \text{Relation 5}$$

where Re(450), Re(550), and Re(650) are in-plane retardations (unit: nm) of the laminate of the first protective layer and the second protective layer or the second protective layer at wavelengths of about 450 nm, about 550 nm, and about 650 nm, respectively.

$$|Rth(450)|/|Rth(550)|>|Rth(650)|/|Rth(550)|, \qquad \text{Relation 6}$$

where Rth(450), Rth(550), and Rth(650) are out-of-plane retardations (unit: nm) of the laminate of the first protective layer and the second protective layer or the second protective layer at wavelengths of about 450 nm, about 550 nm, and about 650 nm, respectively.

In an embodiment, the laminate of the first protective layer 200 and the second protective layer 300 or the second protective layer 300 may have Re(450)/Re(550) of about 0.1 to about 10, and, in an embodiment, about 0.5 to about 5, and, in an embodiment, about 1 to about 3, and Re(650)/Re(550) of about 0.1 to about 5, and, in an embodiment, about 0.1 to about 3, and, in an embodiment, about 0.5 to about 2. Within this range, Relation 5 can be easily realized.

In an embodiment, the laminate of the first protective layer 200 and the second protective layer 300 or the second protective layer 300 may have Re(450) of about 0 nm to about 10 nm, and, in an embodiment, about 0 nm to about 7 nm, Re(550) of about 0 nm to about 10 nm, and, in an embodiment, about 0 nm to about 8 nm, and, in an embodiment, about 0 nm to about 5 nm, and Re(650) of about 0 nm to about 6 nm, and, in an embodiment, about 0 nm to about 3 nm. Within this range, Relation 5 can be easily realized.

In an embodiment, the laminate of the first protective layer 200 and the second protective layer 300 or the second protective layer 300 may have |Rth(450)|/|Rth(550)| of about 0.1 to about 10, and, in an embodiment, about 0.5 to about 5, and, in an embodiment, about 1 to about 3.5, and, in an embodiment, about 1 to about 3, and |Rth(650)|/|Rth(550)| of about 0.1 to about 5, and, in an embodiment, about 0.1 to about 3, and, in an embodiment, about 0.1 to about 2. Within this range, Relation 6 can be easily realized.

In an embodiment, the laminate of the first protective layer 200 and the second protective layer 300 or the second protective layer 300 may have Rth(450) of about −200 nm to about 0 nm, and, in an embodiment, about −150 nm to about 0 nm, Rth(550) of about −180 nm to about 0 nm, and, in an embodiment, about −150 nm to about 0 nm, and, in an embodiment, about −150 nm to about −30 nm, and, in an embodiment, about −150 nm to about −50 nm, and Rth(650) of about −160 nm to about 0 nm, and, in an embodiment, about −130 nm to about 0 nm. Within this range, Relation 6 can be easily realized.

Relations 5 and 6 of the laminate of the first protective layer 200 and the second protective layer 300 or the second protective layer 300 may be realized using the composition for the positive C retardation layer described above while adjusting at least one selected from among the kind of solvent, the content of the solvent, the coating thickness, and drying conditions.

The second protective layer 300 (specifically, the positive C retardation layer) or the laminate of the first protective layer 200 and the second protective layer 300 (specifically, the positive C retardation layer) may satisfy the following Relation 7. The following relation is the ratio of out-of-plane retardation to in-plane retardation and is a parameter representing the degree of biaxiality of a birefringence layer. By satisfying this relation, the polarizing plate can reduce color deviation in the panel of the optical display.

$$Rth(550)/Re(550) \leq -50, \qquad \text{Relation 7}$$

where Rth(550) denotes an out-of-plane retardation (unit: nm) of the second protective layer (specifically, the positive C retardation layer) or the first protective layer and the second protective layer at a wavelength of about 550 nm, and Re(550) denotes an in-plane retardation (unit: nm) of the second protective layer (specifically, the positive C retardation layer) or the first protective layer and the second protective layer at a wavelength of about 550 nm. In an embodiment, Rth(550)/Re(550) may be about −350 to about −50, and, in an embodiment, about −300 to about −50.

Polarizer

In an embodiment, the polarizer 100 is an absorption type polarizer that divides incident light into two polarized components orthogonal to each other to transmit one polarized light component while absorbing the other polarized light component.

In an embodiment, the polarizer 100 may have a light transmittance of about 40% or more, and, in an embodiment, about 40% to about 45%. In an embodiment, the polarizer 100 may have a degree of polarization of about 95% or more, and, in an embodiment, about 95% to about 100%, and, in an embodiment, about 98% to about 100%. Within this range, the polarizer 100 can further improve front contrast and durability.

The polarizer 100 may include a uniaxially stretched polarizer containing dichroic dyes. In an embodiment, the polarizer containing dichroic dyes may include a polarizer manufactured through MD uniaxial stretching of a base film for polarizers, followed by dyeing the base film with the dichroic dyes (for example, iodine or iodine-containing potassium iodide). The base film for polarizers may include a polyvinyl alcohol film or a derivative thereof, without being limited thereto. The polarizer 100 may be manufactured by a typical method known to those skilled in the art.

In an embodiment, the polarizer 100 may have an index of refraction of about 1.50 or more, for example, about 1.50 to about 1.65, and, in an embodiment, about 1.51 to about 1.64.

In an embodiment, the polarizer 100 may have a thickness of about 1 μm to about 40 μm, and, in an embodiment, about 5 μm to about 30 μm, and, in an embodiment, about 10 μm to about 25 μm. Within this range, the polarizer 100 may be used in the polarizing plate.

Third Protective Layer

The third protective layer 400 is disposed on an upper surface (light exit surface) of the polarizer 100 to protect the polarizer 100. The third protective layer 400 can provide the effects of improving front contrast ratio, lateral color shift, and black visibility through adjustment of an angle between axes described below.

In an embodiment, the third protective layer 400 may include an optically isotropic film.

In another embodiment, the third protective layer 400 may include an optically anisotropic film.

The third protective layer 400 may have an axis having a high index of refraction and an axis having a low index of refraction in the in-plane direction. Here, "axis having a high index of refraction" and "axis having a low index of refraction" are defined by comparing the indexes of refraction among two axes of the in-plane direction of the third protective layer, that is, the x-axis and the y-axis thereof. Although not particularly limited, in the third protective layer, the axis having a high index of refraction and the axis having a low index of refraction in the in-plane direction may be formed by stretching among the processes of manufacturing the protective layer. For example, the axis having a high index of refraction may be a slow axis and the axis having a low index of refraction may be a fast axis. The third protective layer 400 may include a TD-uniaxially stretched protective film in order to have the axis having a low index of refraction and the axis having a high index of refraction in the in-plane direction.

Assuming that the axis having a high index of refraction in the in-plane direction of the polarizer 100 is a reference axis (0°), an angle of the axis having a low index of refraction with reference to the reference axis in the in-plane direction of the third protective layer 400 may be in a range from about −5° to about +5°. Within this range, it is possible to achieve improvement in front contrast ratio, lateral color shift, and black visibility. As used herein to represent an angle, "+" means an angle in the clockwise direction with reference to a reference point, and "−" means an angle in the counterclockwise direction with reference to the reference point when the reference point is 0°. In the in-plane direction of the polarizer 100, the axis having a high index of refraction may correspond to the machine direction (MD) of the polarizer 100 and the axis having a low index of refraction may correspond to the transverse direction (TD) of the polarizer 100.

In an embodiment, the third protective layer 400 may have an in-plane retardation (Re) of about 5,000 nm or more, and, in an embodiment, about 5,000 nm to about 15,000 nm, and, in an embodiment, about 5,000 nm to about 12,000 nm, at a wavelength of about 550 nm. Within this range, the third protective layer 400 can improve front contrast while suppressing generation of rainbow mura. In an embodiment, the third protective layer 400 may have an out-of-plane retardation (Rth) of about 6,000 nm or more, and, in an embodiment, about 6,000 nm to about 15,000 nm, and, in an embodiment, about 6,000 nm to about 12,000 nm, at a wavelength of about 550 nm. Within this range, the third protective layer 400 can suppress generation of spots due to birefringence while securing improvement in viewing angle in a liquid crystal display. In an embodiment, the third protective layer 400 may have a degree of biaxiality (NZ) of about 2.5 or less, and, in an embodiment, about 1.0 to about 2.2, and, in an embodiment, about 1.2 to about 2.0, and, in an embodiment, about 1.4 to about 1.8, at a wavelength of about 550 nm. Within this range, the third protective layer 400 can suppress generation of spots due to birefringence while maintaining mechanical strength thereof.

In an embodiment, the third protective layer 400 may include a film formed of an optically transparent resin. For example, the third protective layer 400 may include at least one selected from among cellulose ester resins including triacetylcellulose and the like, cyclic polyolefin resins including norbornene, amorphous cyclic polyolefin, and the like, polycarbonate resins, polyester resins including polyethylene terephthalate, polybutylene terephthalate, polyethylene naphthalate, polybutylene naphthalate, and the like, polyether sulfone resins, polysulfone resins, polyamide resins, polyimide resins, non-cyclic polyolefin resins, poly(meth)acrylate resins including poly(methyl methacrylate) and the like, polyvinyl alcohol resins, polyvinyl chloride resins, and polyvinylidene chloride resins, without being limited thereto.

The third protective layer 400 may have a monolayer structure or may include a laminate of monolayer resin films or a film formed by integrating multiple layers through coextrusion.

In another embodiment, the third protective layer 400 may be a protective coating layer. The protective coating layer may be formed of a typical composition known to those skilled in the art.

In an embodiment, the third protective layer 400 may have a thickness of about 1 μm to about 100 μm, and, in an embodiment, about 5 µm to about 100 µm, and, in an embodiment, about 10 µm to about 90 µm, and, in an embodiment, about 15 µm to about 85 µm. Within this range, the third protective layer 400 can be used in the polarizing plate.

Although not shown in the FIGURE, one or more functional coating layers, such as a hard-coating layer, an antifingerprint layer, an antireflection layer, and the like, may be further formed on an upper surface of the third protective film 140. In addition, although not shown in the FIGURE, the polarizer 100 may be stacked on the third protective layer 400 via an adhesive layer and/or a bonding layer.

Next, a polarizing plate according to another embodiment of the present invention will be described.

The polarizing plate according to another embodiment may be substantially the same as the polarizing plate according to the above-described embodiment except for a stacking sequence of the third protective layer, the polarizer, the second protective layer, and the first protective layer.

In an embodiment, the third protective layer is stacked on an upper surface of the polarizer, and the second protective layer and the first protective layer are sequentially stacked on a lower surface of the polarizer in the stated order from the polarizer.

In an embodiment, an adhesive layer or a bonding layer may be formed on a lower surface of the first protective layer to adhesively attach the polarizing plate to a panel of an optical display. In an embodiment, the upper surface of the polarizer may correspond to a light exit surface of the polarizer, and the lower surface of the polarizer may correspond to a light incidence surface of the polarizer. That is, light emitted from the panel and incident on the polarizing plate may pass through the first protective layer, the second protective layer, the polarizer, and the third protective layer.

Further details of the polarizer, the first protective layer, the second protective layer, and the third protective layer according to the present embodiment may be the same as those described above.

The polarizing plate according to an embodiment of the present invention may further include a fourth protective layer including a positive A retardation layer.

Next, a polarizing plate according to a further embodiment will be described.

The polarizing plate according to the present embodiment includes a third protective layer, a polarizer, a first protective layer, a second protective layer, and a fourth protective layer, which are sequentially stacked one above another in the stated order, in which the fourth protective layer may include a positive A retardation layer. The polarizing plate according to the present embodiment may be substantially the same as the above-described polarizing plate with the exception of the fourth protective layer. Thus, the following description will focus on the fourth protective layer.

The fourth protective layer may include the positive A retardation layer satisfying a relation: nx>ny≈nz, where nx, ny, and nz are the indexes of refraction of the positive A plate layer in the slow axis direction, the fast axis direction, and the thickness direction thereof at a wavelength of 550 nm, respectively. As a result, the polarizing plate can exhibit further improvement in contrast at opposite angles and light leakage.

In an embodiment, the fourth protective layer, specifically the positive A retardation layer, may have Re of 50 nm to about 200 nm, and, in an embodiment, 70 nm to about 180 nm, and, in an embodiment, 90 nm to about 150 nm at a wavelength of 550 nm. Within this range, the polarizing plate can exhibit improvement in contrast at opposite angles and light leakage.

In an embodiment, the fourth protective layer, specifically the positive A retardation layer, may include at least one of a protective film, a protective coating layer, and a liquid crystal panel.

The protective film may be formed of at least one selected from among cellulose resins including triacetylcellulose (TAC) and the like, polyester resins including polyethylene terephthalate (PET), polybutylene terephthalate, polyethylene naphthalate (PEN), polybutylene naphthalate, and the like, cyclic polyolefin resins, polycarbonate resins, polyether sulfone resins, polysulfone resins, polyamide resins, polyimide resins, polyolefin resins, polyacrylate resins polyvinyl alcohol resins, polyvinyl chloride resins, and polyvinylidene chloride resins, without being limited thereto. In an embodiment, the protective film may be a TAC film or a PET film.

In an embodiment, the protective coating layer may be formed of at least one selected from among a heat-curable composition and a photocurable composition.

The liquid crystal panel allows change in alignment of liquid crystals depending upon application of voltage, such that light emitted from a light source can or cannot pass therethrough. The liquid crystal panel does not require a positive A retardation layer in an optical laminate, thereby enabling thickness reduction of the optical display.

The liquid crystal panel may include a pair of substrates and a liquid crystal layer interposed between the substrates and acting as a display medium. One substrate (color filter substrate) is provided with a color filter and a black matrix, and the other substrate (active matrix substrate) is provided with a switching element (for example, TFT) for controlling electrical and optical properties of liquid crystals, and signal lines and pixel lines for imparting gate signals to the switching element, without being limited thereto.

In an embodiment, the liquid crystal panel may adopt in-plane switching (IPS) mode liquid crystals. As a result, the liquid crystal display can improve viewing angle characteristics.

In an embodiment, the liquid crystal panel may have an in-plane retardation of 70 nm to about 180 nm, and, in an embodiment, 90 nm to about 150 nm, at a wavelength of 550 nm.

The in-plane retardation of the liquid crystal panel at a wavelength of 550 nm may be controlled through adjustment of the thickness of the liquid crystal layer in the liquid crystal panel.

An optical display according to the present invention includes the polarizing plate according to the present invention. In an embodiment, the optical display may include a light emitting diode display including an organic light emitting diode display and the like, an IPS or FFS liquid crystal display, and the like. In the optical display, the polarizing plate according to the present invention may be provided as a viewer-side polarizing plate or a light source-side polarizing plate.

In an embodiment, the liquid crystal display includes a liquid crystal panel, the polarizing plate according to the present invention (viewer-side polarizing plate) stacked on a light exit surface of the liquid crystal panel, and a polarizing plate (light source-side polarizing plate) stacked on a light incidence surface of the liquid crystal panel. The polarizing plate stacked on the light incidence surface may include a typical polarizing plate well known to those skilled in the art.

The liquid crystal display includes a light source on a lower surface of the light source-side polarizing plate. The light source may include a light source having a continuous luminous spectrum. For example, the light source may include a white LED (white LED) light source, a quantum dot (QD) light source, a metal fluoride red phosphor light source, and, in an embodiment, a KSF ($K_2SiF_6:Mn^{4+}$) phosphor or KTF ($K_2TiF_6:Mn^{4+}$) phosphor-containing light source, and the like. The liquid crystal panel may be an IPS mode panel, without being limited thereto.

Next, the present invention will be described in further detail with reference to some examples. However, these examples are provided for illustration and should not be construed in any way as limiting the present invention.

Example 1

A composition for a positive C retardation layer was prepared by mixing a polystyrene compound (comprising a fluorine-containing polystyrene unit, Eastman Co., Ltd.) and PGMEA. A positive C retardation layer (thickness: 5 μm, Index of refraction: 1.52, Tg: 213° C.) was formed on a lower surface of a triacetylcellulose (TAC) film (KC4CT1W, thickness: 40 μm, Re: 0.10 nm, Rth: 0.30 nm, NZ: 0.8, Index of refraction: 1.48 @ 550, Konica Co., Ltd.) by coating the prepared composition on the lower surface of the TAC film, followed by drying.

A polarizer (thickness: 17 μm, Index of refraction: 1.52) was manufactured by uniaxially stretching a polyvinyl alcohol film (VF-TS #4500, thickness: 45 μm, Kuraray Co., Ltd.) at 30° C. to two times an initial length thereof in the MD of the polyvinyl alcohol film, followed by dyeing the stretched film with iodine and stretching the dyed film in an aqueous solution of boric acid at 60° C.

An upper surface of the TAC film was bonded to a lower surface (light incidence surface) of the polarizer. A polarizing plate was manufactured by bonding a polyethylene terephthalate (PET) film (thickness: 80 μm, Re: 8,500 nm, Rth: 9,300 nm, NZ: 1.55 @ 550 nm, Toyobo Co., Ltd.) to an upper surface (light exit surface) of the polarizer.

In Table 1, the index of refraction was measured by a refractometer (Prism Coupler, Metricon Co., Ltd.), Tg was measured in a thermogram using a thermal analyzer DSC 8000 (Perkin Elmer Co., Ltd.) by heating about 10 mg of the positive C retardation layer at a heating rate Ramp of about 10° C./min from about 20° C. to 300° C., and retardation was measured using an AxoScan retardation tester.

Examples 2 to 4

Retardation films and polarizing plates were manufactured in the same manner as in Example 1 except that the positive C retardation layer was changed as listed in Table 1.

Example 5

A polarizing plate was manufactured in the same manner as in Example 1 except that the positive A retardation layer was further formed on the lower surface of the positive C retardation layer.

Comparative Example 1

A polarizing plate was manufactured in the same manner as in Example 1 by sequentially stacking a TAC film, a polarizer, and a PET film, except that the positive C retardation layer was not formed.

Comparative Examples 2 to 5

A polarizing plate was manufactured in the same manner as in Example 1 except that the positive C retardation layer was changed as listed in Table 1.

The polarizing plates prepared in the Examples and Comparative Examples were evaluated as to properties listed in Table 1.

(1) Equation 1 (unit: %): A laminate of the TAC film and the positive C retardation layer in each of the Examples and Comparative Examples was measured as to out-of-plane retardation at a wavelength of 550 nm. The out-of-plane retardation of the laminate at 550 nm was measured after leaving the laminate at 60° C. and 95% RH for 250 hours. Then, the value of Equation 1 was calculated.

(2) Equation 2 (unit: %): The polarizing plate prepared in each of the Examples and Comparative Examples was cut into a rectangular specimen (70 mm×70 mm in MD×TD). The specimen was left at 85° C. for 24 hours and the MD length of the polarizing plate was measured. The value of Equation 1 was calculated.

(3) Luminance (unit: nit): A liquid crystal display (having the same configuration as FULL HD LED TV ADONIS (43", Model: TS-430)) was manufactured except that the polarizing plate prepared in each of the Examples and Comparative Examples was used as a viewer-side polarizing plate. White luminance at a front side of the liquid crystal display was measured using a luminance tester EZCONTRAST X88RC (EZXL-176R-F422A4, ELDIM).

(4) Lateral color shift (Δx,y, no unit): A liquid crystal display (having the same configuration as FULL HD LED TV ADONIS (43", Model: TS-430)) was manufactured except that the polarizing plate prepared in each of the Examples and Comparative Examples was used as a viewer-side polarizing plate. Color coordinates x and y were measured at (45°, 45°) and (45°, 135°) as (θ, φ) using a luminance instrument EZCONTRAST X88RC (EZXL-176R-F422A4, ELDIM). Δx,y was calculated based on the color coordinates x and y at (45°, 45°) and (45°, 135°).

TABLE 1

| | Positive C retardation layer | | | Retardation characteristics of laminate of TAC film and positive C retardation layer | | | | | | | | |
|---|---|---|---|---|---|---|---|---|---|---|---|---|
| | Thickness | Index of refraction | Tg | Re (550) | Rth (550) | Re(450)/ Re(550) | Re(650)/ Re(550) | \|Rth(450)\|/ \|Rth(550)\| | \|Rth(650)\|/ \|Rth(550)\| | Eq. 1 | Eq. 2 | Luminance | Lateral Δx, y |
| Example 1 | 5 | 1.52 | 213 | 0.3 | −70 | 1.5 | 1.0 | 1.1 | 0.9 | −4 | −0.37 | 288 | 0.05 |
| Example 2 | 5 | 1.50 | 193 | 0.5 | −72 | 1.6 | 0.9 | 1.1 | 1.0 | −7 | −0.40 | 282 | 0.05 |
| Example 3 | 6 | 1.51 | 185 | 0.3 | −84 | 1.4 | 1.0 | 1.1 | 0.9 | −8 | −0.42 | 286 | 0.04 |

TABLE 1-continued

|  | Positive C retardation layer | | | Retardation characteristics of laminate of TAC film and positive C retardation layer | | | | | | | | |
| --- | --- | --- | --- | --- | --- | --- | --- | --- | --- | --- | --- | --- |
|  | Thickness | Index of refraction | Tg | Re (550) | Rth (550) | Re(450)/ Re(550) | Re(650)/ Re(550) | $\|Rth(450)\|/$ $\|Rth(550)\|$ | $\|Rth(650)\|/$ $\|Rth(550)\|$ | Eq. 1 | Eq. 2 | Luminance | Lateral $\Delta x, y$ |
| Example 4 | 2 | 1.51 | 197 | 0.7 | −35 | 1.7 | 1.0 | 1.2 | 0.9 | −6 | −0.41 | 286 | 0.06 |
| Comparative Example 1 | — | — | — | — | — | — | — | — | — | — | — | 265 | 0.12 |
| Comparative Example 2 | 5 | 1.46 | 110 | 0.8 | −68 | 2.5 | 0.6 | 1.3 | 0.8 | −20 | −0.50 | 258 | 0.06 |
| Comparative Example 3 | 5 | 1.58 | 80 | 0.6 | −65 | 2.1 | 0.9 | 1.7 | 0.9 | −34 | −0.54 | 247 | 0.06 |
| Comparative Example 4 | 5 | 1.58 | 140 | 0.7 | −71 | 1.6 | 0.7 | 1.4 | 0.8 | −18 | −0.49 | 245 | 0.05 |
| Comparative Example 5 | 5 | 1.65 | 85 | 0.5 | −74 | 1.4 | 0.2 | 1.5 | 0.9 | −29 | −0.52 | 232 | 0.05 |

As shown in Table 1, the polarizing plate according to the present invention includes a positive C retardation layer having a thin thickness and satisfies Equations 1 and 2 to secure good reliability and improvement in luminance. In addition, although not shown in Table 1, the positive C retardation layer exhibited substantially the same level of retardation as the laminate.

Further, although not shown in Table 1, the polarizing plate of Example 5 had further improved effects compared to the polarizing plate of Example 1.

Conversely, the polarizing plates of Comparative Examples 2 to 5 failed to satisfy the index of refraction according to the present invention and did not exhibit significant improvement in luminance. In addition, the polarizing plates of Comparative Examples 2 to 5 failed to satisfy the glass transition temperature according to the present invention and Equations 1 and 2, thereby providing low reliability.

Although some embodiments have been described herein, it should be understood that various modifications, changes, alterations, and equivalent embodiments can be made by those skilled in the art without departing from the spirit and scope of the present invention.

What is claimed is:

1. A polarizing plate comprising:
  a polarizer; and a first protective layer and a second protective layer sequentially stacked on a surface of the polarizer,
  wherein the second protective layer comprises a positive C retardation layer,
  the positive C retardation layer having a thickness of about 10 μm or less, an index of refraction of about 1.50 to about 1.55, and a glass transition temperature (Tg) of about 150° C. to about 250° C., and
  wherein a difference in index of refraction between the positive C retardation layer and the polarizer is about 0.05 or less, and
  an index of refraction of the first protective layer is the same or less than that of the positive C retardation layer.

2. The polarizing plate according to claim 1, wherein a difference in index of refraction between the positive C retardation layer and the first protective layer is about 0.1 or less.

3. The polarizing plate according to claim 1, wherein the positive C retardation layer is a non-liquid crystal layer.

4. The polarizing plate according to claim 1, wherein the positive C retardation layer comprises at least one compound selected from among a cellulose ester compound or a polymer thereof and an aromatic compound or a polymer thereof.

5. The polarizing plate according to claim 4, wherein the aromatic compound comprises a polystyrene compound.

6. The polarizing plate according to claim 5, wherein the polystyrene compound comprises a halogen.

7. The polarizing plate according to claim 1, wherein the positive C retardation layer has an out-of-plane retardation of about −180 nm to about 0 nm and an in-plane retardation of about 0 nm to about 10 nm at a wavelength of about 550 nm.

8. The polarizing plate according to claim 1, wherein a laminate of the first protective layer and the second protective layer satisfies at least one of the following Relations 5 and 6:

$$Re(450)/Re(550) > Re(650)/Re(550), \qquad \text{Relation 5}$$

where Re(450), Re(550), and Re(650) denote in-plane retardations (unit: nm) of the laminate of the first protective layer and the second protective layer at wavelengths of about 450 nm, 550 nm, and 650 nm, respectively; and $$|Rth(450)|/|Rth(550)| > |Rth(650)|/|Rth(550)|, \qquad \text{Relation 6}$$

where Re(450), Re(550), and Re(650) denote out-of-plane retardations (unit: nm) of the laminate of the first protective layer and the second protective layer at wavelengths of about 450 nm, 550 nm, and 650 nm, respectively.

9. The polarizing plate according to claim 8, wherein the laminate of the first protective layer and the second protective layer has Re(450)/Re(550) of about 0.1 to about 10 and Re(650)/Re(550) of about 0.1 to about 5.

10. The polarizing plate according to claim 8, wherein the laminate of the first protective layer and the second protective layer has |Rth(450)|/|Rth(550)| of about 0.1 to about 10 and |Rth(650)|/|Rth(550)| of about 0.1 to about 5.

11. The polarizing plate according to claim 1, wherein a laminate of the first protective layer and the second protective layer satisfies the following Relation 7:

$Rth(550)/Re(550) \leq -50,$ where Rth(550) denotes an out-of-plane retardation (unit: nm) of the laminate of the first protective layer and the second protective layer at a wavelength of about 550 nm, and Re(550) denotes an in-plane retardation (unit: nm) of the laminate of the first protective layer and the second protective layer at a wavelength of about 550 nm.

12. The polarizing plate according to claim 1, wherein the first protective layer has an in-plane retardation of about 10 nm or less and an out-of-plane retardation of about −10 nm to about 10 nm at a wavelength of about 550 nm.

13. The polarizing plate according to claim 1, wherein the first protective layer comprises a cellulose ester resin film.

14. The polarizing plate according to claim 1, wherein the first protective layer and the second protective layer are sequentially stacked on the surface of the polarizer in the stated order or an order opposite to the stated order.

15. The polarizing plate according to claim 1, further comprising: a third protective layer on another surface of the polarizer.

16. The polarizing plate according to claim 15, wherein the third protective layer has an in-plane retardation of about 5,000 nm or more at a wavelength of about 550 nm.

17. The polarizing plate according to claim 1, wherein a laminate of the first protective layer and the second protective layer has an out-of-plane retardation variation rate of about −15% to 0%, as calculated by the following Equation 1:

Out-of-plane retardation variation rate=$[(A-B)/B] \times 100,$ where B denotes an initial out-of-plane retardation (unit: nm) of the laminate of the first protective layer and the second protective layer at a wavelength of about 550 nm, and A denotes an out-of-plane retardation (unit: nm) of the laminate of the first protective layer and the second protective layer at a wavelength of about 550 nm after the laminate is left at about 60° C. and about 95% relative humidity (RH) for about 250 hours.

18. The polarizing plate according to claim 1, wherein the polarizing plate has an MD shrinkage rate of about −0.48% to 0%, as calculated by the following Equation 2:

MD shrinkage rate=$[(C-D)/D] \times 100,$ where D denotes an initial MD length (unit: mm) of the polarizing plate, and C denotes an MD length (unit: mm) of the polarizing plate after the polarizing plate is left at about 85° C. for about 24 hours.

19. The polarizing plate according to claim 1, further comprising a fourth protective layer, the fourth protective layer comprising a positive A retardation layer.

20. An optical display comprising the polarizing plate according to claim 1.

21. The polarizing plate according to claim 1, wherein the index of refraction of the first protective layer is about 1.45 to about 1.50.

* * * * *